(12) United States Patent
Krishnan

(10) Patent No.: US 6,961,758 B2
(45) Date of Patent: Nov. 1, 2005

(54) PERSONALIZED INTERNET CONTENT SERVER SYSTEM

(75) Inventor: Venkatesh Krishnan, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 760 days.

(21) Appl. No.: 09/896,582

(22) Filed: Jun. 29, 2001

(65) Prior Publication Data

US 2003/0005077 A1    Jan. 2, 2003

(51) Int. Cl.[7] ............ G06F 15/16; G06F 15/173; G08G 1/09; G08G 1/123
(52) U.S. Cl. ............ 709/217; 709/219; 709/224; 709/226; 709/229; 340/905; 340/910; 340/995
(58) Field of Search ................ 709/219, 224, 709/226, 229, 217, 218; 340/905, 910, 995

(56) References Cited

U.S. PATENT DOCUMENTS

| | | | |
|---|---|---|---|
| 6,128,663 A * | 10/2000 | Thomas | 709/228 |
| 6,424,998 B2 * | 7/2002 | Hunter | 709/207 |
| 6,470,386 B1 * | 10/2002 | Combar et al. | 709/224 |
| 6,484,092 B2 * | 11/2002 | Seibel | 701/209 |
| 6,546,421 B1 * | 4/2003 | Wynblatt et al. | 709/225 |
| 6,615,131 B1 * | 9/2003 | Rennard et al. | 701/200 |
| 6,690,292 B1 * | 2/2004 | Meadows et al. | 340/905 |
| 6,757,740 B1 * | 6/2004 | Parekh et al. | 709/245 |
| 6,799,201 B1 * | 9/2004 | Lee et al. | 709/217 |
| 6,823,225 B1 * | 11/2004 | Sass | 700/94 |
| 6,845,396 B1 * | 1/2005 | Kanojia et al. | 709/224 |
| 2002/0013850 A1 * | 1/2002 | Mitchell et al. | 709/229 |
| 2002/0052934 A1 * | 5/2002 | Doherty | 709/219 |
| 2003/0195950 A1 * | 10/2003 | Huang et al. | 709/219 |

* cited by examiner

Primary Examiner—Ario Etienne
Assistant Examiner—El Hadji M. Sall

(57) ABSTRACT

A personalized content server system is described that includes a profile module that receives a profile file specifying personal preferences of a user for some content. An access module accesses remote content servers external to the personalized content server system for the content specified by the profile file. A content storage stores the content such that the content can be retrieved from the content storage when the user accesses the personalized content server system for the content via an access client.

17 Claims, 3 Drawing Sheets

PERSONALIZED INTERNET CONTENT SERVER SYSTEM

BACKGROUND OF THE INVENTION

1. Field of the Invention

The present invention pertains to Internet and World Wide Web ("WWW"). More particularly, this invention relates to a personalized Internet content server system that provides personalized content service and content management to Internet users.

2. Description of the Related Art

As is known, the Internet typically refers to a number of data service systems connected together via a high speed interconnect network. Each data service system typically includes web or other content servers that host contents for various customers. The servers can also host applications. Each of the data service systems is typically implemented by a computer system (e.g., a server computer system). A number of remote user terminals may be connected to a data service system via an interconnect network (e.g., a telephone network). The remote user terminals are typically referred to as clients.

This arrangement allows users at the user terminals to access the contents, services, and/or applications hosted in various data service systems. Each user terminal is equipped with a web browser that allows the user terminal to access the contents, services, and/or applications hosted in various data service systems.

More and more entities now have their own web sites and/or web pages. For example, Hewlett-Packard Company has a home page at "www.hp.com". When a user accesses that site, the user can get news announcement, product information, and contact information, etc. The user may also be permitted to purchase products via that site. The user can also move to other pages to get even more information and/or service. This means a site may contain hundred or even thousand web pages. This is typically the case if the user accesses an Internet portal site such as "www.yahoo.com", or "www.aol.com". Nowadays, persons or entities wanting to have their content hosted and accessed via the Internet can employ data farms to host their content. Data farm refers to a service provider that has the server system (or multiple systems) that can host contents for various customers. In this case, the customers do not have to individually purchase and maintain the necessary hardware to host their contents.

In addition to this, a wide variety of new Internet-based media delivery platforms have also been developed. Internet radio is just one example of such platforms. Under this platform, the broadcaster only needs to employ a special audio web server as the radio station to broadcast audio signals over the Internet. The broadcast from an Internet radio station can be picked up by any client system with audio processing and playing capabilities.

The Internet radio technology allows the listeners to have access to a huge and growing number of Internet radio stations, and thus huge amount of content. Today, there are approximately thousands of Internet radio stations worldwide, and the number is still growing rapidly.

However, the rapid growth of the Internet and widespread use of Web (WWW) have made it very difficult for Internet users to effectively and efficiently manage contents of their choice or preference. The Internet users also find it difficult to identify contents of their choice. This is especially true in Internet radio broadcasting. As of today, there does not exist a mechanism that helps Internet users manage contents of their preferences, or aids listeners of Internet radio stations in identifying and managing audio broadcasts of their preferences.

SUMMARY OF THE INVENTION

One feature of the present invention is to provide content management for an Internet user.

Another feature of the present invention is to aid an Internet user in collecting and managing Internet content of the user's choice.

Another feature of the present invention is to provide an Internet user or Internet radio listener a dynamically selected, updated, and personalized content program.

Below described is a personalized content server system. The system includes a profile module that receives a profile file specifying personal preferences of a user for some content. An access module accesses remote content servers external to the personalized content server system for the content specified by the profile file. A content storage stores the content such that the content can be retrieved from the content storage when the user accesses the personalized content server system for the content via an access client.

Other features and advantages of the invention will become apparent from the following detailed description, taken in conjunction with the accompanying drawings, illustrating by way of example the principles of the invention.

DETAILED DESCRIPTION OF THE INVENTION

Figure 1:
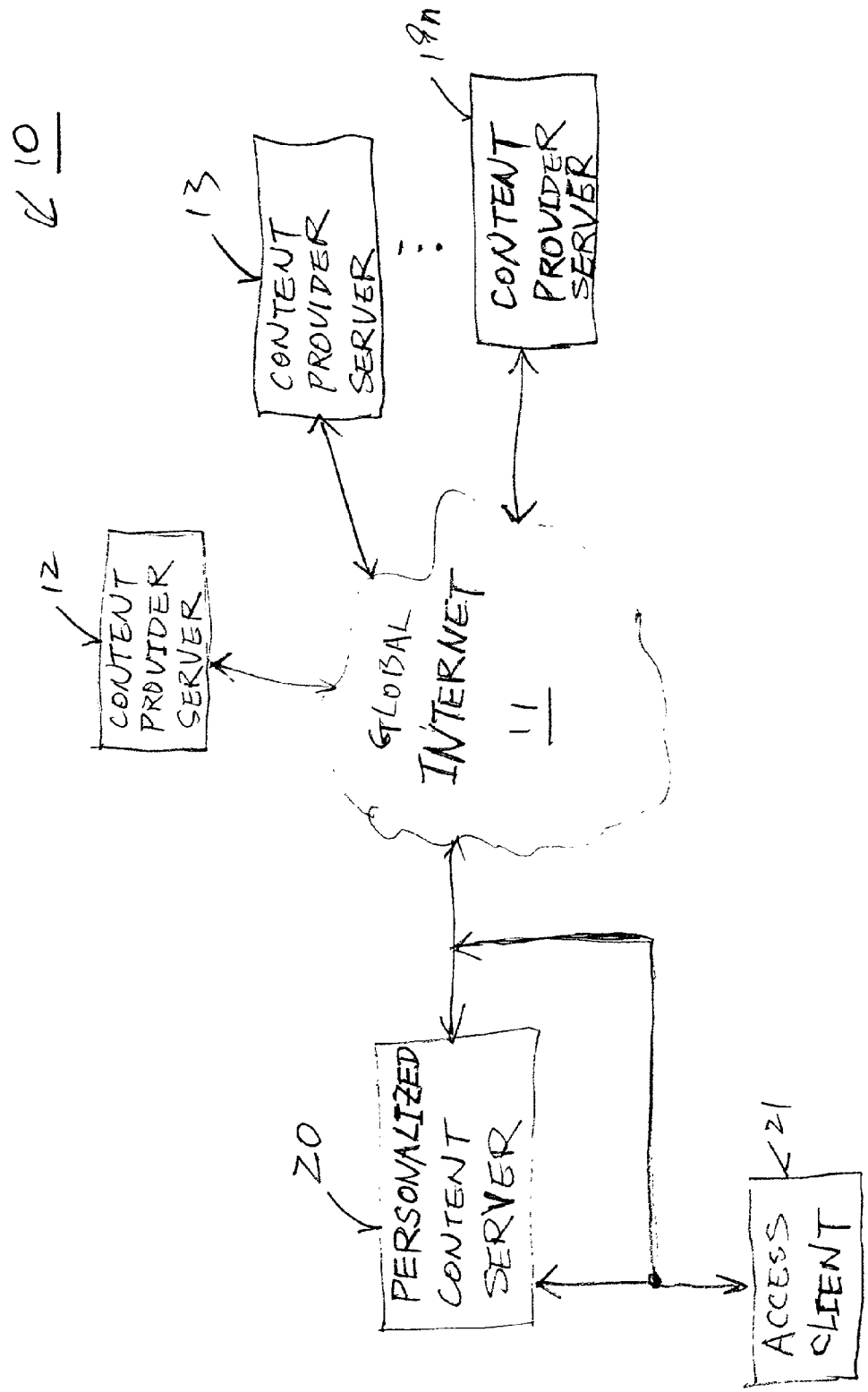
FIG. 1 schematically shows an Internet system having a personalized content server system that implements one embodiment of the present invention.

FIG. 1 shows an Internet system 10 that includes a personalized content server system 20 that implements one embodiment of the present invention. In addition to the personalized content server system 20, the Internet system 10 also includes a global Internet 11 and a number of content servers 12 through 19n connected to the global Internet 11. The content servers 12–19n contain contents that the personalized content server system 20 may need.

In accordance with one embodiment of the present invention, the personalized content server system 20 provides content management for an Internet user. It also aids an Internet user in collecting and managing Internet content of the user's choice. It provides Internet users or Internet radio listeners a dynamically selected, updated, and personalized content program.

The content personalization of the personalized content server system 20 employs the notion of context with respect to the Internet user. For example, if an Internet user wants all traffic information and he or she is located in San Francisco, Calif., the context would indicate that the user wants all traffic related information in San Francisco area. If an Internet user wants all traffic information and he or she is located in San Jose, Calif., the context would indicate that the user wants all traffic related information in San Jose area.

In addition, if the user does not specify the time of the traffic information, the context means that the user is interested in the current traffic information (i.e., now). This means that an Internet user can access content from different contexts and the personalization can change based on the context.

The dynamic aspect of the personalized content server system 20 is that it provides access to short term events (e.g., new bulletin) that are not scheduled. For example, an Internet user can register interest, for example, in news relating to a company (e.g., Hewlett-Packard Company). When the bulletin occurs, the personalized content server system 20 captures and customizes the content.

As will be described in more detail below, the personalized content server system 20 includes a profile module (i.e., the profile module 31 in FIG. 2) that receives a profile file specifying personal preferences of a user for some content. An access module (i.e., the access module 33 in FIG. 2) accesses remote content servers (i.e., the content servers 12–19*n*) external to the personalized content server system 20 for the content specified by the profile file. A content storage (i.e., the content storage 34 in FIG. 2) stores the content such that the content can be retrieved from the content storage when the user accesses the personalized content server system 20 for the content via an access client (i.e., the access client 21). The personalized content server system 20 will be described in more detail below, also in conjunction with FIGS. 1 through 3.

Referring to FIG. 1, the global Internet 11 is connected to the personalized content server 20. The global Internet 11 is formed by connecting a number of data service systems together via high speed and high bandwidth networks. The global Internet 11 is known in the art, and will not be described in more detail below. The global Internet 11 may also include Intranet systems (not shown in FIG. 1).

The global Internet 11 is connected to the content provider servers 12 through 19*n*. In one embodiment, these servers 12–19*n* are part of the global Internet 11. Each of the content servers 12–19*n* can be implemented by any known means. Each of the content servers 12–19*n* can be any kind of content server. For example, each of the servers 12–19*n* may be a news server, an email server, an Internet radio server, an application server, an e-commerce server, or a combination thereof.

Each of the content servers 12–19*n* hosts contents that can be accessed by any source external to the content server. This means that systems like the personalized content server 20 can access the contents hosted in the content servers 12–19*n* via the global Internet 11. Many open standard communication protocols (e.g., HTTP (Hyper Text Transport Protocol), SAP (Session Announcement Protocol)), and standard web information description languages (e.g., XML (Extensible Markup Language), or HTML (Hyper Text Markup Language)) can be used for communications with the content servers 12–19*n*.

The personalized content server 20 is connected to the global Internet 11. This means that the personalized content server 20 can access the content servers 12–19*n* via the global Internet 11 using known open standard Internet communication protocols and/or languages. This is done in known manner and will not be described in more detail below.

The personalized content server 20 is also connected to an access client 21. FIG. 1 only shows one access client for illustration purposes. In practice, the personalized content server 20 can be connected to a number of access clients like the access client 21. The access client 21 is used by an Internet user to access the personalized content server system 20 for the personalized content the Internet user has previously specified to the personalized content server system 20.

The access client 21 can be a remote access terminal with Internet access function (e.g., Web browser). The access client 21 is connected to the personalized content server 20 via a communication network (not shown in FIG. 1). The communication network can be wired communication network, wireless communication network, or a combination thereof.

The access client 21 can be a computer system, or a portable handheld electronic device. For example, the access client 21 can be cellular phone, a personal digital assistant, a palm-top computer, a notebook computer, an Internet radio receiver, or an information appliance.

In accordance with one embodiment of the present invention, the personalized content server 20 is used to provide personalized contents to the Internet user at the access client 21. This means that the personalized content server system 20 either personalizes the contents received from the content servers 12–19*n* in accordance with the user's choice or preference, or only receives the contents specified by the user's choice or preference. The personalized content server 20 may also do both. This allows the personalized content server system 20 to provide personalized content service to Internet users in accordance with their choices or preferences. The users can then access the personalized content server system 20 via their respective access clients (e.g., the access client 21) for their personalized contents.

In addition, the access client 21 is also connected to the global Internet 11. The communication between the access client 21 and the personalized content server system 20 (or with the global Internet 11) is done using known open standard communication protocols (e.g., HTTP, SAP), and standard web information description languages (e.g., XML, or HTML).

The user specifies his/her choice or preference in a profile file. The profile file is transmitted to the personalized content server system 20. In one embodiment, the user employs the access client (e.g., the access client 21) to transmit the profile file. In another embodiment, the personalized content server system 20 includes a local access terminal (e.g., monitoring terminal) that allows the user to input the user's profile file to the system 20.

The profile file indicates the user's choices, preferences, or selections of contents. Each content selection within the profile file includes the name of the content, the address of the content, and the time at which the content is retrieved or updated. In addition, the time can be a time range which specifies the start and end time of the content.

During operation, the personalized content server system 20 first receives the profile file. Then the personalized content server system 20 discovers the respective content servers that store the requested contents specified by the profile file. The personalized content server system 20 can either retrieves the requested contents and stores them, or just stores the addresses of the requested contents. In addition, the personalized content server system 20 has a mechanism that allows it to update the requested contents. The personalized content server system 20 then serves any user request for the personalized contents.

Because the personalized content server system 20 employs the notion of context (discussed above), the profile file may not need to be very specific. For example, if an Internet user wants all traffic information and he or she is located in San Francisco, Calif., the context will interpret that the profile file indicates that the user wants all traffic related information in San Francisco area. In addition, if the user does not specify the time of the traffic information, the context will interpret that the user is interested in the current traffic information (i.e., now). This means that an Internet user can access content from different contexts and the personalization can change based on the context.

The dynamic aspect of the personalized content server system 20 is that it provides access to short term events (e.g., new bulletin) that are not scheduled. For example, an Internet user can register interest, for example, in news relating to a company (e.g., Hewlett-Packard Company). When the bulletin occurs, the personalized content server system 20 captures and customizes the content.

Figure 2:
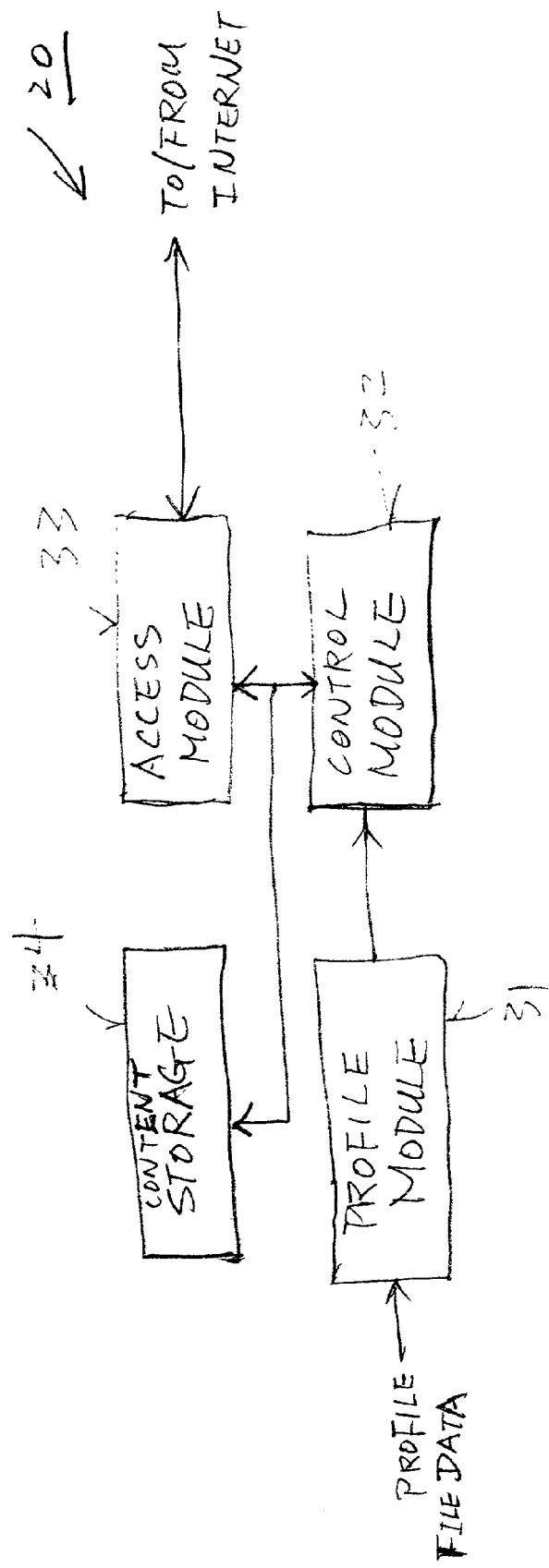
FIG. 2 shows the structure of the personalized content server system of FIG. 1.

In one embodiment, the personalized content server system 20 retrieves the requested contents, edits the contents to eliminate unwanted portions of the contents in accordance with the profile file, and then stores them in a content storage (i.e., the storage 34 in FIG. 2). In another embodiment, the personalized content server system 20 only stores the addresses of the requested contents, and sends the addresses to the requesting user at a particular access client, thus enabling the access client to directly retrieves the requested content from the respective content servers. Alternatively, the personalized content server system 20 stores the addresses of the requested contents, and accesses the respective content servers for the requested contents only when the personalized content server system 20 receives a user request for such contents. The structure and operation of the personalized content server system 20 is shown in more detail in FIG. 2, which will be described in more detail below.

Referring to FIG. 2, the structure of the personalized content server 20 is shown. As can be seen from FIG. 2, the personalized content server 20 includes the profile module 31, the control module 32, the access module 33, and the content storage 34. Each of the modules 31–34 can be implemented using known means and technology in hardware and/or software form. Thus, their structures will not be described in more detail below.

The profile module 31 receives the profile file. In one embodiment, the profile module 31 includes a graphical user interface (i.e., the interface 40 shown in FIG. 3) that allows the user either at the access client 21 of FIG. 1 or at a local access terminal of the personalized content server system 20 to create and input the user's profile file. The graphical user interface of the profile module 31 can be implemented using known technology. The structure of the graphical user interface will be described in more detail below, also in conjunction with FIG. 3.

Referring again to FIG. 2, the profile module 31 saves the profile file upon receiving it. The profile module 31 then sends the profile file to the control module 32 upon system startup of the system 20.

The control module 32 then causes the access module 33 to discover remote content servers (e.g., the content servers 12–19n) external to the personalized content server system 20 that contain the contents specified by the profile file. The control module 32 also filters out unwanted contents based on the instructions specified in the profile file. The control module 32 also controls the personalized content server system 20 to serve any user request for the corresponding personalized contents.

There are a several ways for the access module 33 to perform the discovery function. One way is to use the addresses specified in the profile file. In this case, the access module 33 only needs to invoke its Internet access function and accesses the remote content servers for the contents. Another way (i.e., when the profile file does not contain the address of a particular content) is to use search engines (e.g., Yahoo, Excite) to locate the sites that contain the requested contents.

The content storage 34 stores the requested contents such that the content can be retrieved from the content storage 34 when the user accesses the personalized content server system 20 for the content via an access client (e.g., the access client 21). Alternatively, the content storage 34 stores the addresses of the requested contents. The content storage 34 can be any kind of storage device or module.

Figure 3:
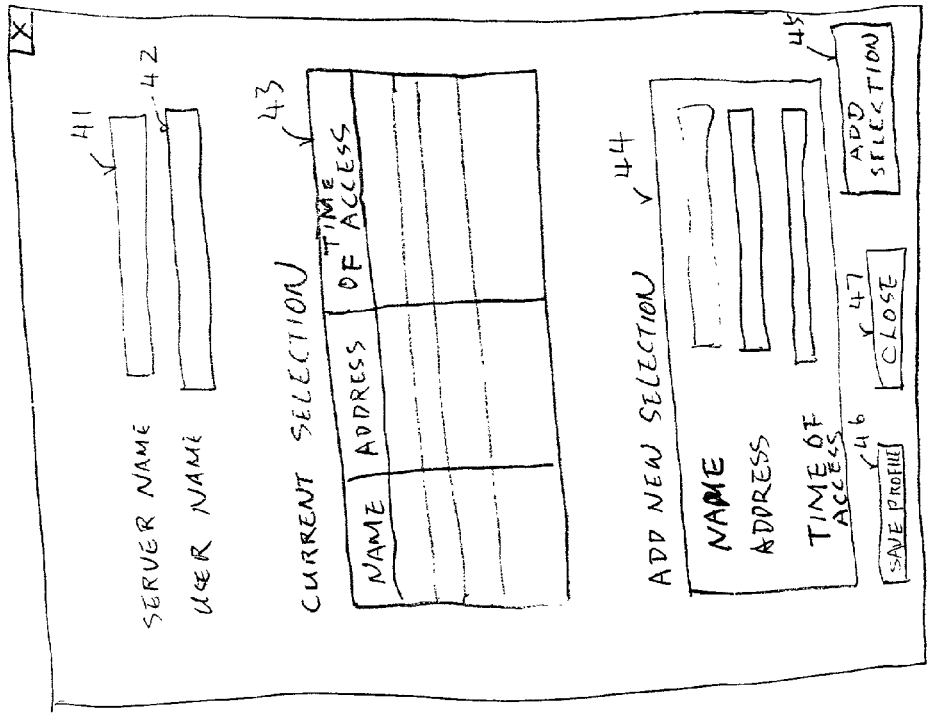
FIG. 3 shows an example user interface provided by the profile module of the personalized content server system of FIG. 2.

In FIG. 3, the graphical user interface 40 of the profile module 31 of FIG. 2 includes the Server_Name field 41 which specifies the name of the server to which the profile file is sent, a User_Name field 42 that identifies the user by whom the profile file is created. The interface 40 also includes a Current_Selection field 43 that lists the current selection by the user of the profile file. Each entry includes the name of the content (or page), the address of the content, and the time at which the content is to be retrieved from the remote content server.

In addition, the interface 40 also includes the Add_New_Selection field 44 that allows the user to add and/or specifies new selection or preference. The interface 40 also includes the ADD_SELECTION button 45 to add newly inputted selection to the current selection list. The interface 40 also includes a SAVE_PROFILE button 46 and a CLOSE button 47.

In the foregoing specification, the invention has been described with reference to specific embodiments thereof. It will, however, be evident to those skilled in the art that various modifications and changes may be made thereto without departing from the broader spirit and scope of the invention. The specification and drawings are, accordingly, to be regarded in an illustrative rather than a restrictive sense.

What is claimed is:

1. A personalized content server system, comprising:
a profile module that receives a profile file specifying personal preferences of a user for vehicle traffic report content;
an access module that accesses at least one remote content server that contains the traffic vehicle traffic report content specified by the profile file, said at least one remote content server external to said personalized content server system and accessible via a global Internet;
a control module coupled with said access module, said control module for limiting said personalized content server system to receive only the vehicle traffic report content specified by said personal preferences of said user from said at least one remote content server; and
a content storage that stores the vehicle traffic report content such that the vehicle traffic report content can be retrieved from the content storage when the user accesses the personalized content server system for the vehicle traffic report content via an access client.

2. The personalized content server system of claim 1, wherein the control module filters out unwanted vehicle traffic report content obtained by the access module based on the profile file.

3. The personalized content server system of claim 1, wherein the profile module receives the profile file from the user via the access client through the Internet.

4. The personalized content server system of claim 1, wherein the profile module further comprises a graphical user interface to allow the user of the personalized content server system to input the profile file into the profile module.

5. The personalized content server system of claim 1, wherein the content is a dynamically changing content, wherein the access module also accesses the remote content servers for any updates of the retrieved content.

6. The personalized content server system of claim 1, wherein the access module accesses the remote content servers for the content by retrieving the addresses of the content only.

7. The personalized content server system of claim 5, wherein the content storage stores the Internet addresses and the access module again accesses the remote content servers for the content using the addresses when the content is requested by the user via the access client.

8. The personalized content server system of claim 1, wherein each of the remote content servers is a news server, an e-mail server, an Internet radio server, an application server, or an e-commerce server.

9. A personalized content server system, comprising:
   a profile module that receives a profile file specifying personal preferences of a user for Internet radio content;
   an access module that accesses a plurality of remote content servers that contains the Internet radio content specified by the profile file, said plurality of remote content servers external to said personalized content server system and accessible via a global Internet;
   a control module coupled with said access module, said control module for limiting said personalized content server system to receive only the Internet radio content specified by said personal preferences of said user from said plurality of remote content servers; and
   a content storage that stores the Internet radio content such that the content can be retrieved from the content storage when the user accesses the personalized content server system for the content via an access client.

10. The personalized content server system of claim 9, wherein the control module filters out unwanted Internet radio content obtained by the access module based on the profile file.

11. The personalized content server system of claim 9, wherein the content is a dynamically changing content, wherein the access module also accesses the remote content servers for any updates of the retrieved content.

12. The personalized content server system of claim 9, wherein the access module accesses the remote content servers for the content by retrieving the addresses of the content only.

13. The personalized content server system of claim 11, wherein the content storage stores the Internet addresses and the access module again accesses the remote content servers for the content using the addresses when the content is requested by the user via the access client.

14. A personalized content server system, comprising:
   a profile module that receives a profile file specifying personal choice preferences of a user for Internet application content;
   an access module that accesses a plurality of remote content servers that contains the Internet application content specified by the profile file, said plurality of remote content servers external to said personalized content server system and accessible via a global Internet;
   a control module coupled with said access module, said control module for limiting said personalized content server system to receive only the Internet application content specified by said personal preferences of said user from said plurality of remote content servers; and
   a content storage that stores the Internet application content such that the content can be retrieved from the content storage when the user accesses the personalized content server system for the content via an access client.

15. The personalized content server system of claim 14, wherein the content is a dynamically changing content, wherein the access module also accesses the remote content servers for any updates of the retrieved content.

16. The personalized content server system of claim 14, wherein the access module accesses the remote content servers for the content by retrieving the addresses of the content only.

17. The personalized content server system of claim 14, wherein the content storage stores the Internet addresses and the access module again accesses the remote content servers for the content using the addresses when the content is requested by the user via the access client.

* * * * *